No. 880,842. PATENTED MAR. 3, 1908.
L. E. WATERMAN.
AGRICULTURAL IMPLEMENT.
APPLICATION FILED OCT. 22, 1906.

4 SHEETS—SHEET 1.

Witnesses
Edwin L. Bradford.
J S Clark

Inventor
Lewis E. Waterman
By A. O. Behel.
Attorney

No. 880,842. PATENTED MAR. 3, 1908.
L. E. WATERMAN.
AGRICULTURAL IMPLEMENT.
APPLICATION FILED OCT. 22, 1906.

4 SHEETS—SHEET 2.

Witnesses
Edwin L. Bradford
J S Clark

Inventor
Lewis E. Waterman
By A. O. Behel.
Attorney

No. 880,842. PATENTED MAR. 3, 1908.
L. E. WATERMAN.
AGRICULTURAL IMPLEMENT.
APPLICATION FILED OCT. 22, 1906.
4 SHEETS—SHEET 3.
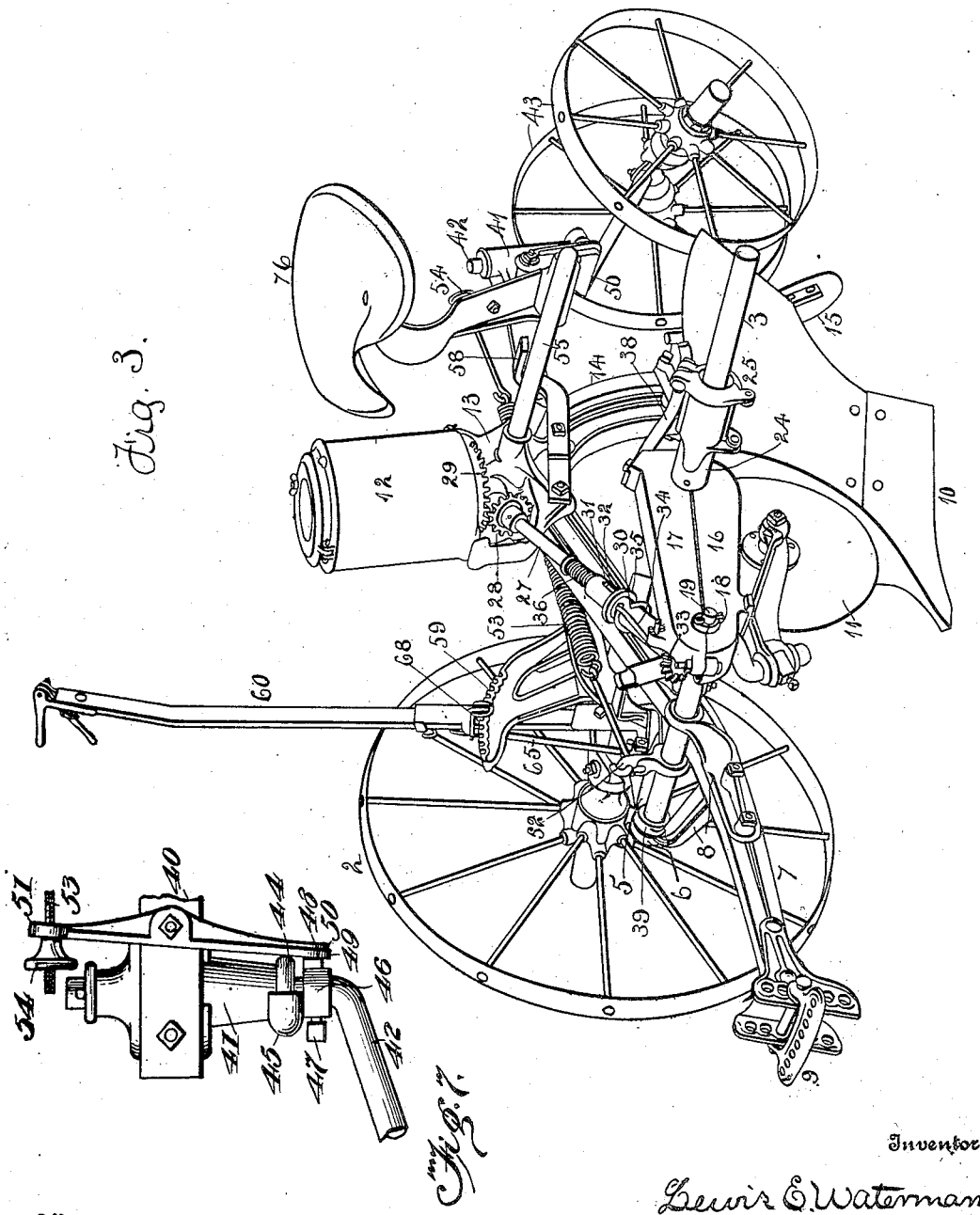
Witnesses
Edwin L. Bradford
J S Clark
Inventor
Lewis E. Waterman
By A. O. Behel
Attorney No. 880,842. PATENTED MAR. 3, 1908.
L. E. WATERMAN.
AGRICULTURAL IMPLEMENT.
APPLICATION FILED OCT. 22, 1906.
4 SHEETS—SHEET 4.
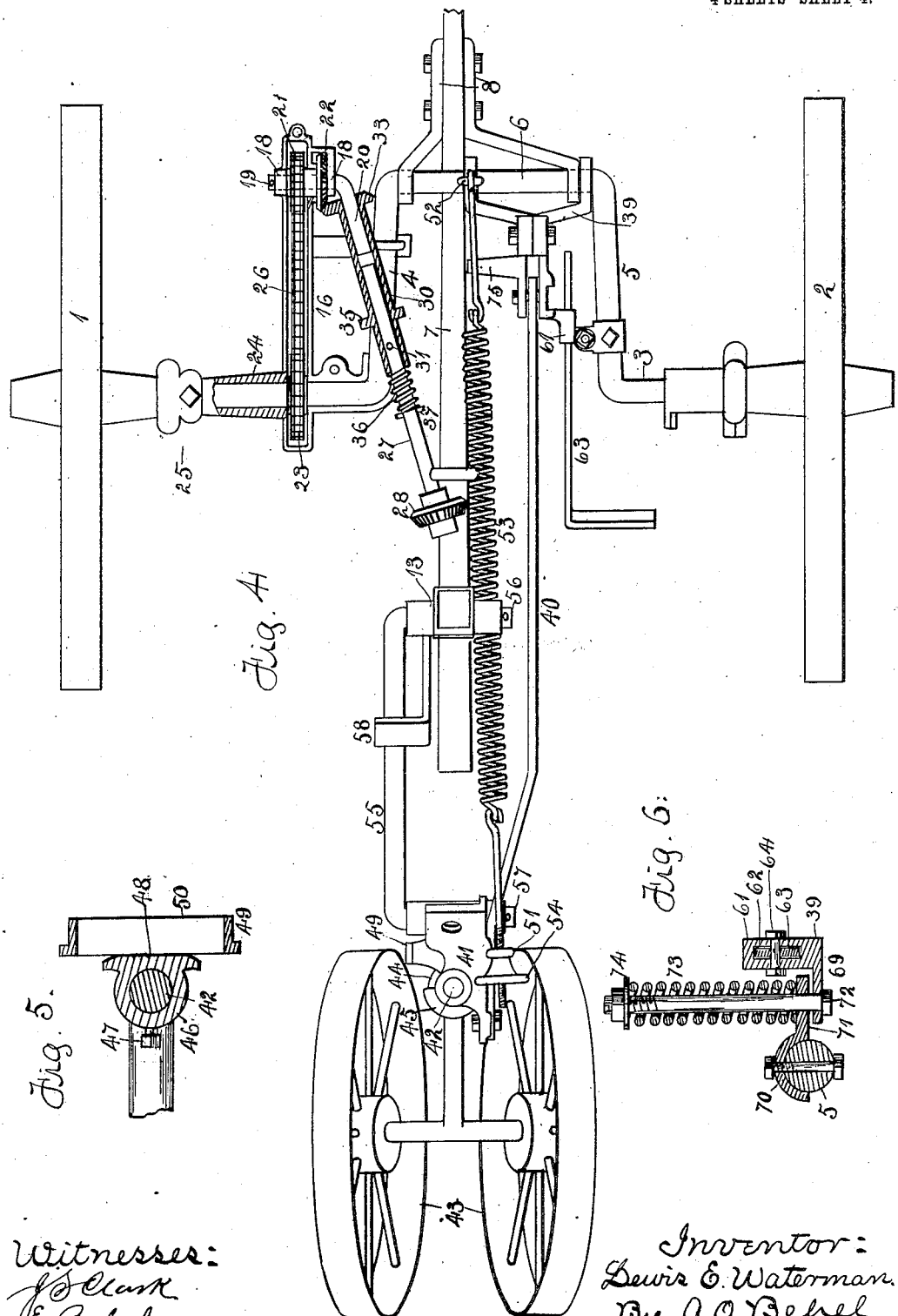
Witnesses:
J. S. Clark
E. Behel.
Inventor:
Lewis E. Waterman.
By A. O. Behel
Atty.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

AGRICULTURAL IMPLEMENT.

No. 880,842.　　　　Specification of Letters Patent.　　　　Patented March 3, 1908.

Application filed October 22, 1906. Serial No. 339,977.

*To all whom it may concern:*

Be it known that I, LEWIS E. WATERMAN, a citizen of the United States, residing at Rockford, in the county of Winnebago and State of Illinois, have invented certain new and useful Improvements in Agricultural Implements, of which the following is a specification.

The object of this invention is to construct an agricultural implement having the features pointed out in the claims.

Figure 1:
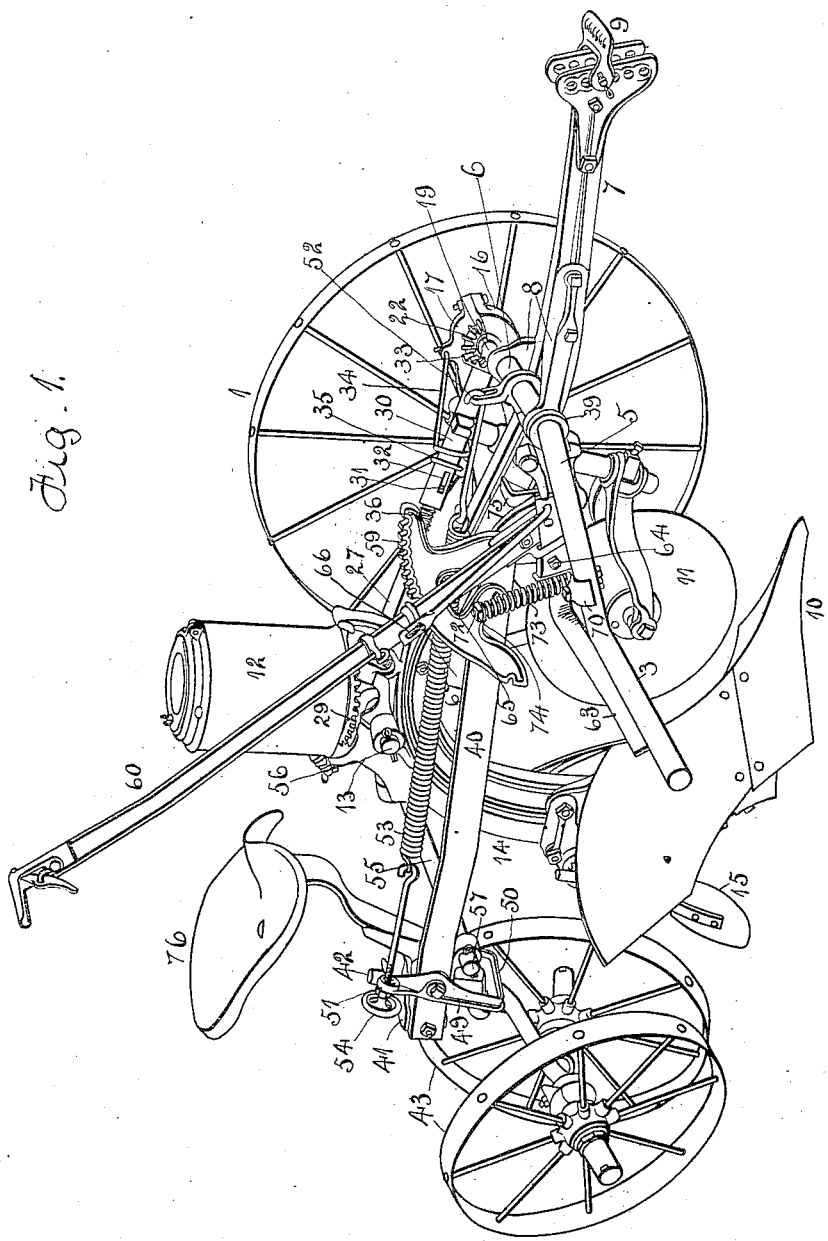
Figure 2:
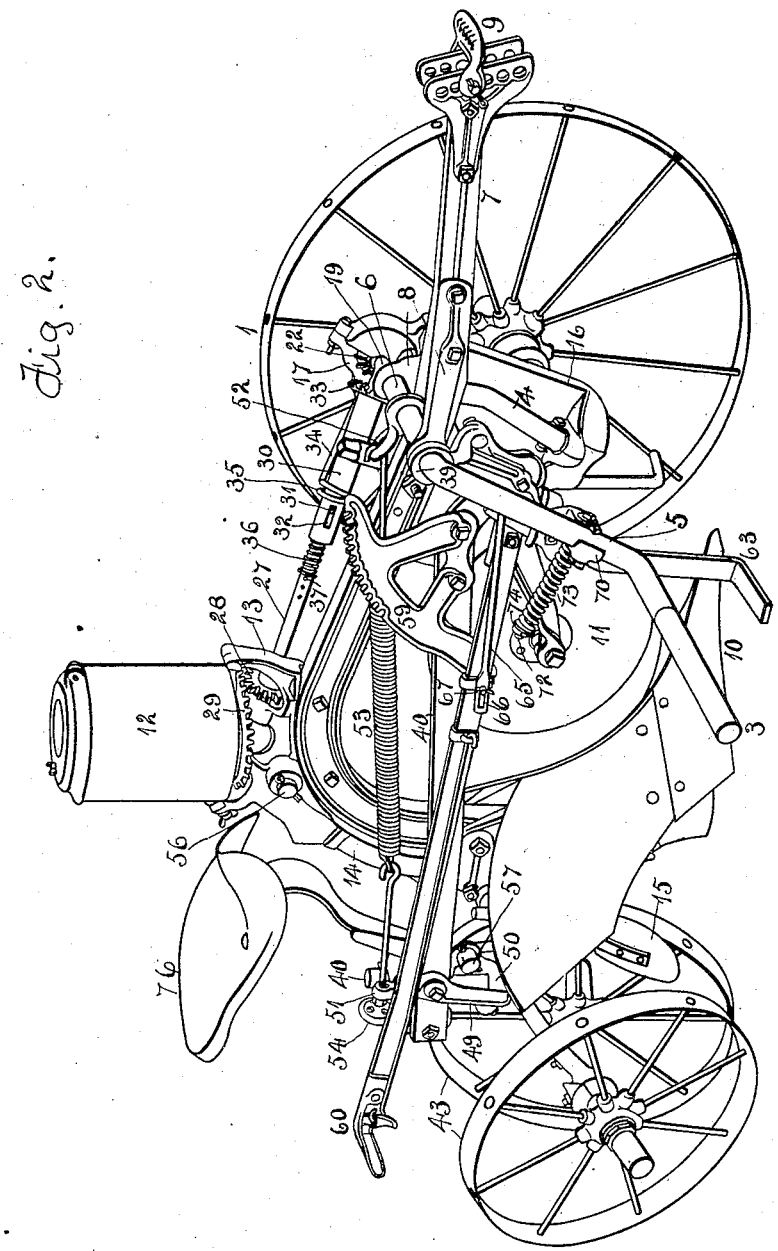

In the accompanying drawings. Figure 1 is a perspective view of a riding lister, in which the plow is partially lowered. Fig. 2 is a perspective view of the lister, in which the plow is elevated. Fig. 3 is a perspective view of the lister, in which the plow is in working position. Fig. 4 is a plan view of the lister, in which certain parts have been removed in order that the remaining parts may be more clearly seen. Fig. 5 is a horizontal section through the cam or flat surface 48 of the collar 46 and the lower bar 50 of the yoke. Fig. 6 is a vertical section of the spring connection between the axle and plow beam. Fig. 7 is an elevation of the rear portion of the frame showing the connection of the caster wheel therewith.

The forward wheels 1 and 2 support an axle 3 having a bail portion composed of the parallel arms 4 and 5 and an end section 6.

A plow beam 7 is located between the wheels 1 and 2 and has a pivotal connection with the end section 6 by the brackets 8. The forward end of the plow beam supports a clevis 9, and the rear turned-down end has a double mold-board plow 10 secured to it. A rolling colter 11 has a connection with the plow beam in any suitable manner.

A foot rest or lever 38 has a fixed connection with the upper section 17 of the casing.

To the section 6 of the bail of the axle is pivoted a link 39, which extends rearward therefrom. To the rear end of this link 39 is pivoted a bar 40 which extends rearward therefrom. A bracket 41 has a fixed connection with the rear end of the bar 40. This bracket has a tubular vertical opening within which is located a caster-wheel support 42. The caster-wheel is composed of two wheels 43 acting as seed coverers, and a support for the rear portion of the plow beam.

The connection between the bracket 41 and caster-wheel support 42 is formed by a flange 44 on the lower end of the bracket being received in a recessed collar 45 formed in connection with the collar 46 connected by a set-screw 47 to the caster-wheel support. This connection permits the wheel support to oscillate in the bracket, at the same time preventing the disengagement between the parts.

The forward face of the collar 46 has a flat surface 48 with curved ends and located in a vertical plane. A yoke 49 has a pivotal connection with the bracket 41. The lower bar 50 of this yoke rests against the flat face 48 of the collar 46, and one arm of the yoke extends above the pivot of the yoke and has its upper end 51 formed with a horizontal opening.

From the link 39 extends a perforated projection 52. A spring 53 has one end connected to the projection 52, and its other end has a connection with the upper end 51 of the yoke 49. The hand-wheel 54 has a screw-thread connection with the end of the spring and by which the tension of the spring can be varied. The action of this spring on the yoke 49 is to hold the bar 50 of the yoke yieldingly against the flat surface 48 of the collar 46 and which holds the caster-wheel in proper working position, but permitting it to caster in either direction.

A link 55 has one end 56 pivoted to the bracket 13 supporting the seed box, and its other end 57 is pivoted to the bracket 41 with which the caster-wheel is connected. A stop 58 is secured to the plow beam and overlies the link 55. A toothed-quadrant 59 is secured to the forward portion of the bar 40. A hand-lever 60 has a fixed connection with the rear end of the link 39. This hand-lever has the usual dog engagement with the toothed-quadrant 59.

From the rear portion of the link 39 and in rear of the connection of the hand-lever therewith extends a projection 61 which is provided with an opening 62. A foot lever, 63 is located in the opening 62 and has a pivotal connection with the projection 61 on the bolt 64. A link 65 has its lower end pivotally connected to the forward end of the foot lever 63 and its upper end is provided with a lengthwise extending slot 66. A stud 67 extends from the dog 68 of the lifting lever 60 and passes through the slot 66 of the link 65.

From the projection 39 extends an ear 69. To the arm 5 of the bail portion of the axle is secured a bracket 70 having its free end 71 overlying the ear 69. A bolt 72 passes through the ear 69, and bracket 70. A coiled spring 73 is placed around the bolt 72, one end resting against the bracket 71 and its other end against the nut 74 which has a screw-thread connection with the bolt 72.

By means of the bar 40 and link 55, a pivotal connection is formed between the caster-wheel and plow beam and between the caster-wheel and axle. The hand-lever 60 having a connection with the link 39, and the link having a connection with the bail portion of the axle will rock the axle in the supporting-wheels from the position shown in Fig. 1 into the position shown in Fig. 2. This movement will elevate the forward portion of the plow beam. The link 55 forming a connection between the caster-wheel and rear portion of the plow-beam serves to raise and lower the double mold-board plow attached to the plow beam.

When the plow has been lowered to a certain extent, the stop 58 will come in contact with the link 55 thereby preventing the independent movement of the link in its connection with the plow beam, in order that the point of connection between the link and beam will not drop below a line drawn between the caster-wheel and the connection of the beam with the axle.

By means of the coiled spring 73 a yielding connection is formed between the plow beam and axle. This yielding connection will permit the supporting wheels 1 and 2 to pass over obstructions or descend into hollows without affecting the running depth of the plow.

From the link 39 extends a projection 75 which extends under the coiled spring 53, when the plow is lowered to its fullest extent, the spring 53 will come in contact with this stop and hold the spring from dropping below the center of the axle, that is, pass the dead center, which would have the tendency to hold the plow in the ground.

By means of the foot lever 63 the attendant riding in the seat 76 can, with his foot unlock the dog 68 from its engagement with the toothed-quadrant and throw the lifting lever back so that the dog will engage the rear notch of the toothed-quadrant.

By placing the other foot on the rest 38 and pressing down, assistance can be given to raise the plow by foot power.

I claim as my invention.

1. The combination of a cranked axle, wheels supporting the axle, a plow beam having a pivotal connection with the crank portion of the axle, a caster wheel, a link pivotally connecting the caster wheel and plow beam, and a bar pivotally connecting the caster wheel and crank portion of the axle.

2. The combination of a cranked axle, wheels supporting the axle, a plow beam having a pivotal connection with the crank portion of the axle, a caster wheel, a link pivotally connecting the caster wheel and plow beam, a stop carried by the plow beam and extending over the link and with which the link engages, and a bar pivotally connecting the caster wheel and crank portion of the axle.

3. The combination of a cranked axle, wheels supporting the axle, a plow beam having a pivotal connection with the crank portion of the axle, a caster wheel, a bracket pivotally supported by the caster wheel, a link pivotally connecting the bracket and plow beam, and a bar pivotally connecting the bracket and crank portion of the axle.

4. The combination of a cranked axle, wheels supporting the axle, a plow beam having a pivotal connection with the crank portion of the axle, a caster wheel, a bracket pivotally supported by the caster wheel, a link having its ends turned in the same direction and at right angles to the link, a pivotal connection between one of the ends of the link and bracket and a pivotal connection between the other end of the link and the plow beam, and a bar pivotally connecting the bracket and crank portion of the axle.

5. The combination of a cranked axle, wheels supporting the axle, a plow beam having a pivotal connection with the crank portion of the axle, a bracket pivotally supported by the caster wheel, a link pivotally connecting the bracket and plow beam, and a bar having one end fixedly connected with the bracket and its other end pivotally connected with the crank portion of the axle.

6. The combination of a cranked axle, wheels supporting the axle, a plow beam having a pivotal connection with the crank portion of the axle, a caster wheel, a link pivotally connecting the caster wheel and plow beam, a bar having one end connected with the caster wheel and a link pivotally connecting the other end of the bar with the crank portion of the axle.

7. The combination of a cranked axle, wheels supporting the axle, a plow beam having a pivotal connection with the crank portion of the axle, a caster wheel, a link pivotally connecting the caster wheel and plow beam, a bar having one end connected with the caster wheel, a link pivotally connecting the other end of the bar with the crank portion of the axle and a spring connection between the last mentioned link and crank portion of the axle.

8. The combination of a cranked axle, wheels supporting the axle, a plow beam having a pivotal connection with the crank portion of the axle, a caster wheel, a link pivotally connecting the caster wheel and plow beam, a bar having one end connected with the caster wheel and its other end pivotally connected with the crank portion of the axle, a toothed segment fixedly connected with the forward portion of the bar, and a hand lever connected with the crank portion of the axle and engaging the toothed segment.

9. The combination of a cranked axle, wheels supporting the axle, a plow beam having a pivotal connection with the crank portion of the axle, a caster wheel, a link pivotally connecting the caster wheel and plow beam, a bar having one end connected with the caster wheel, a link pivotally connecting the other end of the bar and crank portion of the axle, a toothed segment fixedly connected with the forward portion of the bar, and a hand lever connected with the last mentioned link and engaging the toothed segment.

10. The combination of a cranked axle, wheels supporting the axle, a plow beam having a pivotal connection with the crank portion of the axle, a caster wheel, a link pivotally connecting the caster wheel and plow beam, a bar forming a connection between the caster wheel and crank portion of the axle, and a foot lever for raising the crank portion of the axle.

11. The combination of a cranked axle, wheels supporting the axle, a plow beam having a pivotal connection with the crank portion of the axle, a caster wheel, a link pivotally connecting the caster wheel and plow beam, a bar having one end connected with the caster wheel and its other end pivotally connected with the crank portion of the axle, and a spring exerting its force on the crank portion of the axle to raise it.

12. The combination of a cranked axle, wheels supporting the axle, a plow beam having a pivotal connection with the crank portion of the axle, a caster wheel, a link pivotally connecting the caster wheel and plow beam, a bar having one end connected with the caster wheel, a link pivotally connecting the other end of the bar and crank portion of the axle, and a spring exerting its force on the last mentioned link to raise the crank portion of the axle.

13. The combination of a cranked axle, wheels supporting the axle, a plow beam having a pivotal connection with the crank portion of the axle, a caster wheel, a link pivotally connecting the caster wheel and plow beam, a bar forming a connection between the caster wheel and crank portion of the axle, a toothed segment fixedly connected to the forward portion of the bar, a hand lever connected with the crank portion of the axle and having a dog engagement with the toothed segment, and a foot lever adapted to actuate the dog of the hand lever and by which the crank portion of the axle may be elevated.

14. The combination of a cranked axle, wheels supporting the axle, a plow beam having a pivotal connection with the crank portion of the axle, a caster wheel, a link pivotally connecting the caster wheel and plow beam, a bar forming a connection between the caster wheel and crank portion of the axle, and two foot levers for raising the crank portion of the axle.

15. The combination of a suitable frame, wheels supporting the forward portion of the frame, a plow beam supported by the frame, a caster wheel supporting the rear portion of the frame, a collar movable with the caster wheel and having a flat surface, and a spring operated device engaging the flat surface.

16. The combination of a suitable frame, wheels supporting the forward portion of the frame, a plow beam supported by the frame, a caster wheel supporting the rear portion of the frame, a collar movable with the caster wheel and having a flat surface, a pivoted yoke having a portion engaging the flat surface and a spring exerting its force on the yoke to hold it against the flat surface.

17. The combination of a cranked axle, wheels supporting the axle, a plow beam pivotally connected with the crank portion of the axle, a caster wheel supporting the rear portion of the plow beam, a collar movable with the caster wheel and having a flat surface, a device engaging the flat surface, and a spring connected with the device and with the crank portion of the axle.

LEWIS E. WATERMAN.

Witnesses:
A. O. BEHEL,
E. BEHEL.